(12) United States Patent
Pasque

(10) Patent No.: US 6,463,644 B1
(45) Date of Patent: *Oct. 15, 2002

(54) TOOL FOR ALIGNING VEHICLE FENDER ON VEHICLE DURING ASSEMBLY

(75) Inventor: Charles R. Pasque, Clinton Township, MI (US)

(73) Assignee: The Paslin Company, Warren, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/639,630

(22) Filed: Apr. 29, 1996

(51) Int. Cl.$^7$ ................................................ B25B 27/14
(52) U.S. Cl. ........................ 29/281.4; 269/21; 269/22; 901/40
(58) Field of Search ............... 29/281.6, 281.4, 29/281.1, 281.5, 428, 429, 464, 465, 466, 743; 269/21, 22; 901/40

(56) References Cited

U.S. PATENT DOCUMENTS

| | | | |
|---|---|---|---|
| 1,119,111 A | | 12/1914 | Pellow et al. |
| 1,130,679 A | | 3/1915 | Staunton |
| 1,744,313 A | * | 1/1930 | Kadow |
| 2,745,665 A | * | 5/1956 | Labombarde |
| 2,936,139 A | | 5/1960 | Lindstrom |
| 3,084,928 A | | 4/1963 | Opitz |
| 3,620,524 A | * | 11/1971 | Czompi ............... 29/281.4 X |
| 3,672,063 A | | 6/1972 | Hopkins et al. |
| 3,794,314 A | * | 2/1974 | Coburn et al. |
| 3,804,397 A | | 4/1974 | Neumann |
| 3,957,263 A | * | 5/1976 | Christl |
| 4,497,476 A | | 2/1985 | Wiele |
| 4,527,783 A | | 7/1985 | Collora et al. |
| 4,530,635 A | * | 7/1985 | Engelbrecht et al. |
| 4,589,184 A | * | 5/1986 | Asano et al. |
| 4,700,488 A | | 10/1987 | Curti |
| 4,822,091 A | * | 4/1989 | Vermeer et al. |
| 4,841,677 A | * | 6/1989 | Kötting |
| 5,040,290 A | * | 8/1991 | Usui et al. ............. 29/281.1 X |
| 5,110,239 A | | 5/1992 | Riley et al. |
| 5,205,080 A | * | 4/1993 | Ibe et al. |
| 5,207,465 A | * | 5/1993 | Rich |
| 5,216,800 A | * | 6/1993 | Nishigori |
| 5,231,753 A | * | 8/1993 | Tanaka et al. |
| 5,249,785 A | | 10/1993 | Nelson et al. |
| 5,317,803 A | * | 6/1994 | Spigarelli et al. |
| 5,344,202 A | * | 9/1994 | Ramler et al. |
| 5,427,363 A | | 6/1995 | Rink et al. |
| 5,542,726 A | * | 8/1996 | Ozawa |
| 5,572,785 A | * | 11/1996 | Tveit |
| 5,829,123 A | * | 11/1998 | Shashlo et al. ........ 29/281.6 X |
| 5,883,932 A | * | 3/1999 | Chiba et al. |
| 5,937,993 A | * | 8/1999 | Sheets et al. |
| 5,953,812 A | * | 9/1999 | Ferrante |
| 5,966,801 A | * | 10/1999 | Wu et al. |

FOREIGN PATENT DOCUMENTS

JP  0193781  * 7/1990  ................ 29/281.4

\* cited by examiner

*Primary Examiner*—David P. Bryant
(74) *Attorney, Agent, or Firm*—Harness, Dickey & Pierce, P.L.C.

(57) ABSTRACT

A tool for holding a component during an assembly process includes a suction cup assembly which is operatively associated with an assembly system. The assembly system includes a supporting fixed frame and a movable subframe. The suction cup assembly is attached to the movable subframe by a movable arm. Each suction cup assembly includes a housing fixed to the movable arm and a suction cup movably positionable within part of a bore formed through the housing. A suction cup driver is provided to selectively and axially position the cup with respect to the housing. The housing comprises a component-abutting boot and a base. The boot includes a face which is contoured so as to substantially mate with the outer surface of the component being held.

4 Claims, 4 Drawing Sheets

TOOL FOR ALIGNING VEHICLE FENDER ON VEHICLE DURING ASSEMBLY

BACKGROUND OF THE INVENTION

The present invention relates to a tool for clamping and aligning a vehicle fender or a similar object against a vehicle. More particularly, the present invention relates to a tool and method for aligning a vehicle body component, such as a door, engine hood, trunk lid, or roof against a vehicle.

BRIEF DESCRIPTION OF THE PRIOR ART

In the assembly of an automotive vehicle, body components are often difficult to correctly attach to the vehicle. The reason for such difficulty is generally founded in the fact that automobile components such as fenders, trunk lids, engine hoods, and roofs tend to be bulky and difficult to attach. In part due to their bulk, these components are generally difficult to align on the vehicle in that their sheer size often leads to their flexing during the assembly operation. The result of such flexing unfortunately results in a poorly fitted fender.

During the early days of automobile manufacture when vehicle components such as fenders were more akin to mud flaps than integrated body components, assembly of such vehicles was less demanding in terms of accuracy than today. For example, the fender fitted to vehicles from the 1920s was mated to the vehicle running board and splash apron along a single joint. Accuracy of alignment was therefore relatively easy to achieve and, in any event, was not a critical feature of these early vehicles because a bead of cord wrapped in a water-resistant material was typically fitted between adjoining members of the automobile body. While eliminating squeaks, this feature also made "a good fit" fairly easy to achieve.

During the 1940s and 1950s when automobile components such as fenders, engine hoods, and trunk lids became more integrated with the vehicle body, a great number and variety of metal-to-metal for components-to-components joint lines were formed. The need for accurate and precise attachment became ever-more apparent.

During the 1980s when considerably more attention was paid to "fit and finish" than in prior decades of automobile manufacturer, the consistence and correct width of lines formed by joined body components of vehicles became more critical. No longer was "close" good enough. Examples of such increased demands for accuracy are perhaps best characterized in automobile television commercials which focused on such accuracy by showing a marble or a steel ball rolling along the joint created by adjacent body panels. That the ball could smoothly and evenly while tracing the joints in its course of motion was supposedly a compliment to the exactness and precision of the design and construction of the vehicle.

Presently, the assembly of body components onto the vehicle frame is an arduous and demanding task that is largely done by highly skilled artisans. For example, once a single body component, such as a fender, is attached to the vehicle frame, an adjacent component, such as a door, is thereafter fitted. The second component is aligned against the vehicle frame by hand by a "fitter". The "fitter" has the responsibility of generally placing the component against the vehicle frame as the initial step. Thereafter, a second worker, known as a "spotter", objectively observes then verifies the correctness and accuracy of the alignment. Once the "spotter" makes his verification, the "fitter" secures the component to the automobile frame using known fastening methods.

While generally providing some level of accuracy, known methods of attaching methods fail in large part due to variations in the "principal locating points". Theoretically, if these points were perfectly situated every time, the known method of attaching a vehicle component would prove satisfactory. However, in reality, relatively significant variations exist in the stamping of each component. For example, the proper fit of the engine hood to the vehicle is attributed to a variety of categories, including hood-to-hood, hinge-to-hinge, and hinge-to-hood attachment points, the positioning of reinforcements that actually form the mounting surface, and the placement positions of the vehicle fender. Accordingly, because of such variations in "principal locating points", present methods of attaching components during the production of an automotive vehicle are inadequate.

In addition, beyond unsatisfactory attachment results, the present method of employing two workers to install each component is very labor intensive and subject to cost and reliability problems commonly associated with such assembly techniques.

Accordingly, a method and apparatus for aligning a vehicle component with respect to an adjacent vehicle component already attached to a frame remains wanting.

BRIEF DESCRIPTION OF THE PRESENT INVENTION

Accordingly, it is the general object of the present invention to overcome the difficulties and disadvantages associated with previous alignment and assembly techniques.

More particularly, it is an object of the present invention to provide a method and apparatus for aligning a component with respect to an adjacent component which relies on a minimum of human labor.

It is an additional object of such a method and apparatus which incorporates a component-holding assembly and a frame for holding the assembly for supporting the assembly which may be moved in any one of a variety of positions around a vehicle.

A further object of the present invention is to incorporate a vacuum system for holding the component against a supporting assembly.

Yet an additional object of the present invention is to provide such a method and apparatus which incorporates an axially movable suction cup within a housing to provide adherence of the components.

Still a further object of the present invention is to provide such a method and apparatus which incorporates a housing for the movable suction cup having a contoured face is capable of substantially mating with the contour of the body of the component being fitted.

Yet an additional object of the present invention is to provide such a method and apparatus which incorporates a spacing wedge fitted to the frame for consistently and accurately spacing adjacent components.

Yet a further object of the present invention is to provide such a method and apparatus which incorporates a variety of body-aligning blocks which may be selectively fitted to the frame.

Another object of the present invention is to provide such a method and apparatus which is selectively operated by air logic sequencing.

Still yet an additional object of the present invention is to provide such a method and apparatus which is applicable in the assembly of any product which comprises two or more components which must be accurately aligned for adjacent positioning.

Other advantages and features of the present invention will become more apparent from the following detailed description when read in conjunction with the accompanying drawing.

BRIEF DESCRIPTION OF THE DRAWINGS

The present invention will be more fully understood by reference to the following description of the preferred embodiments of the present invention when read in conjunction with the accompanying drawings in which like reference characters refer to like parts throughout the views, and in which.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
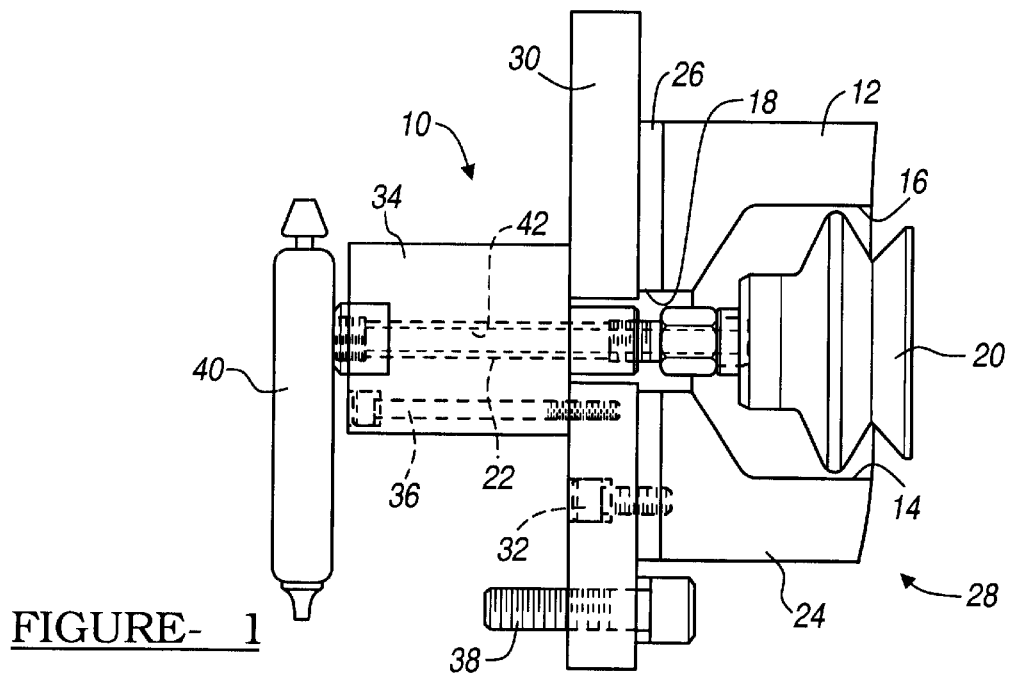
FIG. 1 is a sectional view of a suction cup assembly for holding a component according to the present invention.

Referring to FIG. 1, a suction cup assembly, generally illustrated as 10, is shown. The assembly 10 includes a housing 12 having a bore 14 formed therethrough. The bore 14 includes a suction cup receiving portion 16 and an operating arm portion 18. Movably positioned with the suction cup receiving portion 16 of the bore 14 is a movable suction cup 20. The suction cup 20 is mounted to an axially movable arm 22 which is axially movable through the operating arm portion 18 of the bore 14 of the housing 12. The suction cup 20 is made from a known polymerized material, such as rubber.

The housing 12 comprises two parts, namely a component-abutting boot 24 and a base 26. The boot 24 is preferably formed from a formable material such as a hard rubber. The boot 24 is mechanically or chemically adhered to the base 26. The boot 24 includes a face 28 which may be flat or, alternately, may be contoured to mate with the outer surface of the component to be aligned. A contoured face 28 is illustrated. The face 28 may be either machined or molded to achieve the desired contour.

The housing 12 (defined by the boot 24 and the base 26) is mechanically secured to a bracket 30 by a fastener such as a bolt 32. An operating component, such as a pneumatic driver 34, is mechanically mounted to the bracket 30 by a mechanical fastener such as a bolt 36. The driver 34 is connected to the axially movable arm 22 for selective axial movement thereof. A mechanical fastener, such as a bolt 38, is provided to mount the bracket 30 to a movable frame (not shown in this figure).

A vacuum is selectively created within the suction cup 20 by the evacuation of air therefrom. A vacuum pump 40 is provided at the end of the arm 22. A passageway 42 is axially formed within the arm 22 and fluidly connects the vacuum pump 40 with the suction cup 20.

Figure 2:
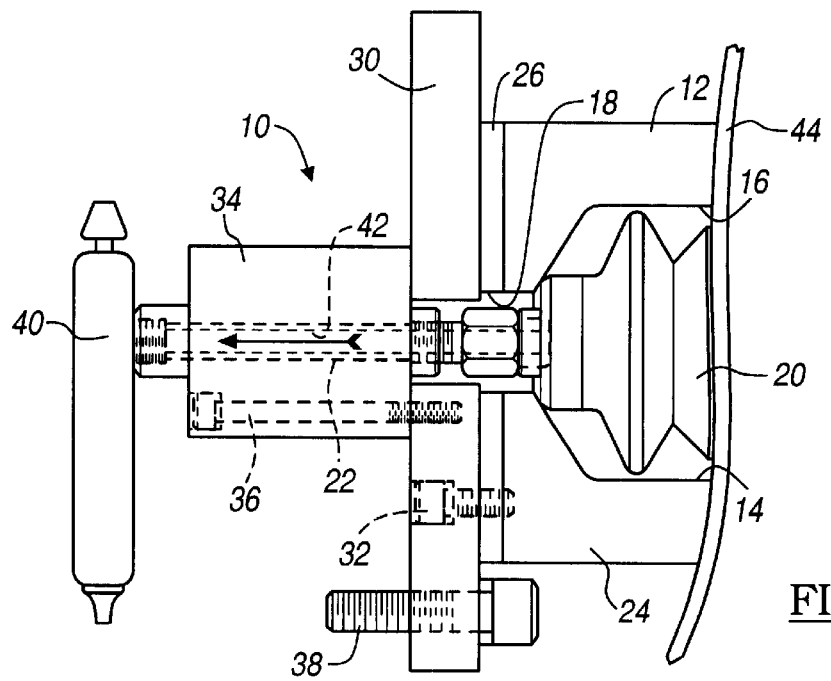
FIG. 2 is a view identical to that of FIG. 1, but showing a component held in place against the suction cup assembly.

FIG. 2 illustrates the suction cup assembly 10 of FIG. 1 but holding a component, generally illustrated as 44, for alignment and assembly. While having a preferred application in the automotive arts, in which case the component 44 would be a vehicle fender, door, roof, trunk lid, or engine hood, the component 44 may be any of a variety of parts. For example, the component 44 may be a door of a stove or refrigerator that is to be aligned to and assembled with a stove or refrigerator. The suction cup assembly 10 of the present invention may also find use as part of a system used in aligning and assembling parts of office furniture, computer housings, and housings for industrial equipment. The system of the present invention has such broad application that it may find use in virtually any assembly process in which one component is to be aligned to and assembled with another component. The only minimal requirement is that the component to be held by the suction cup assembly 10 have at least one area which is capable of being held by suction to the assembly 10.

In operation, the suction cup assembly 10 is generally positioned adjacent the component 44. The suction cup 20, selectively driven by the driver 34 via the arm 22, partially extends beyond the face 28 of the housing 12 to rest against the component 44. The driver 34 continues to drive the suction cup 20 such that the outermost lip of the cup 20 forms a fluid-tight seal with the component 44. The vacuum pump 40 is activated, drawing air from the cup 20 through the passageway 42 of the arm 22, thereby substantially creating at least a partial, component-holding vacuum between the cup 20 and the component 44. The driver 34 next operates in reverse, drawing the now-held component 44 until its outer surface rests snugly against the face 28 of the boot 24. The cup assembly 10 and the component 44 are now manipulable as a unit such that the component 44 may be aligned to and assembled with another part.

The suction cup assembly 10 may be used in a variety of applications, only two of which are presented here. The first such application is shown generally in FIGS. 3 through 6 and is used for assembling a vehicle component to the vehicle. The second such application is shown generally in FIGS. 7 and 8 and is directed to the assembly of two components to form a single assembly.

Figure 3:
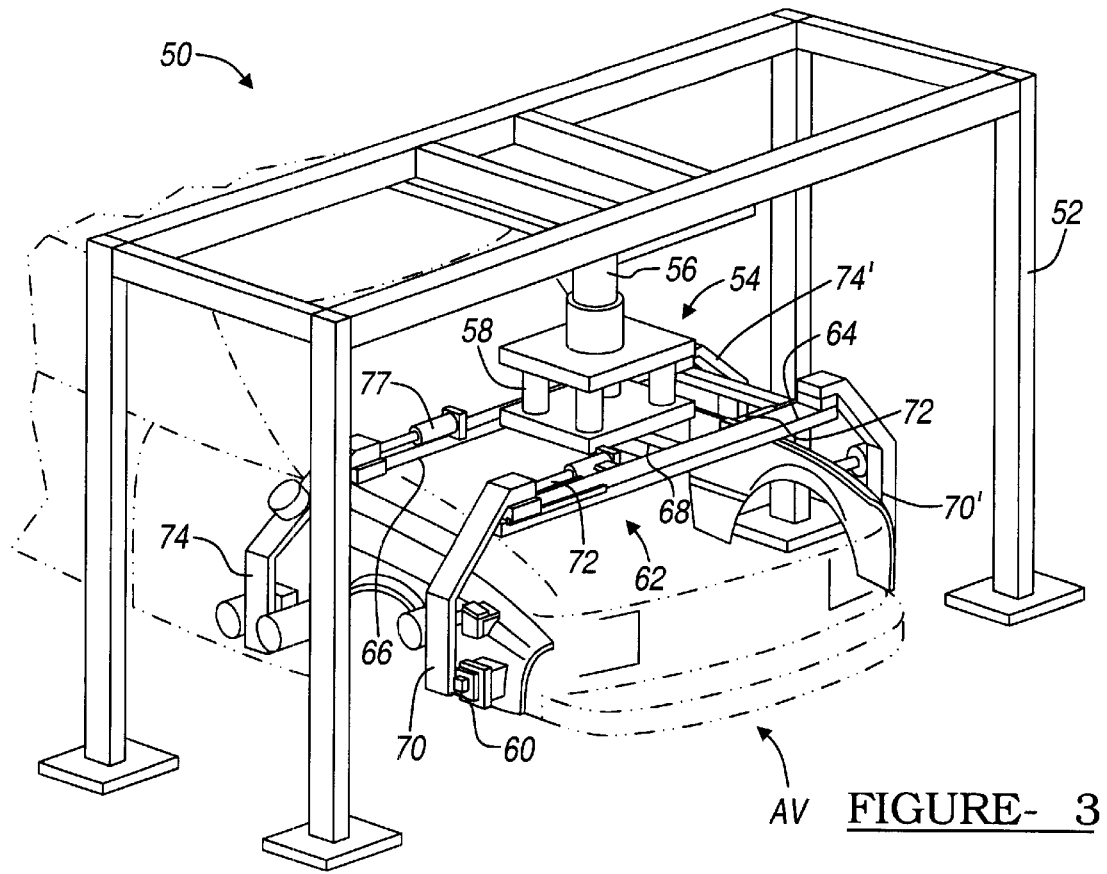
FIG. 3 is an environmental and peripheral view illustrating one of the preferred applications of the cup assembly of FIGS. 1 and 2 in operation as part of a system to support and align an automotive body component during the assembly process.

With respect to FIG. 3, an assembly system, generally illustrated as 50, is shown. The assembly system 50 includes a supporting fixed frame 52 and a movable subframe 54. The fixed frame 52 as shown is fixedly mounted on a floor, but could well be mounted partially or entirely on the ceiling or an adjacent wall. The fixed frame 52 is provided to support the movable subframe 54, so it may be formed in a variety of configurations.

The subframe 54 includes a connecting portion 56, an axially adjustable portion 58, and a suction cup assembly supporting portion 60. The connecting portion 56 fixedly connects the adjustable portion 58 to the fixed frame 52. The adjustable portion 58 adjustably connects the supporting portion 60 to the connecting portion 56. By axial operation of the adjustable portion 58, the supporting portion 60 may be reversibly moved from a vehicle surrounding position in which part of the portion 60 partially surrounds an automotive vehicle (illustrated in broken lines as "AV") as illustrated and a spaced apart position in which the supporting portion 60 is moved upward and away from the vehicle AV.

The supporting portion 60 includes a frame, generally illustrated as 62, which is defined by a pair of spaced-apart parallel members 64 and 66 and a perpendicular interconnecting member 68. The interconnecting member 68 fixes the parallel members 64 and 66 to the adjustable portion 58.

An opposed pair of side arms 70, 70' are slidably attached to the parallel member 64. A pair of drivers 72, 72' (which are preferably pneumatic) are operably connected between the arms 70, 70' and the member 64. Selective operation of the drivers 72, 72' allow movement of the arms 70, 70' toward or away from the vehicle AV.

Similarly, an opposed pair of side arms 74, 74' are slidably attached to the parallel member 66. A pair of drivers of which only one, 76, is illustrated are operably connected between the arms 74, 74' and the member 66. Selective operation of the driver 76 and its unseen counterpart allow movement of the arms 74, 74' toward or away from the vehicle AV.

Figure 4:
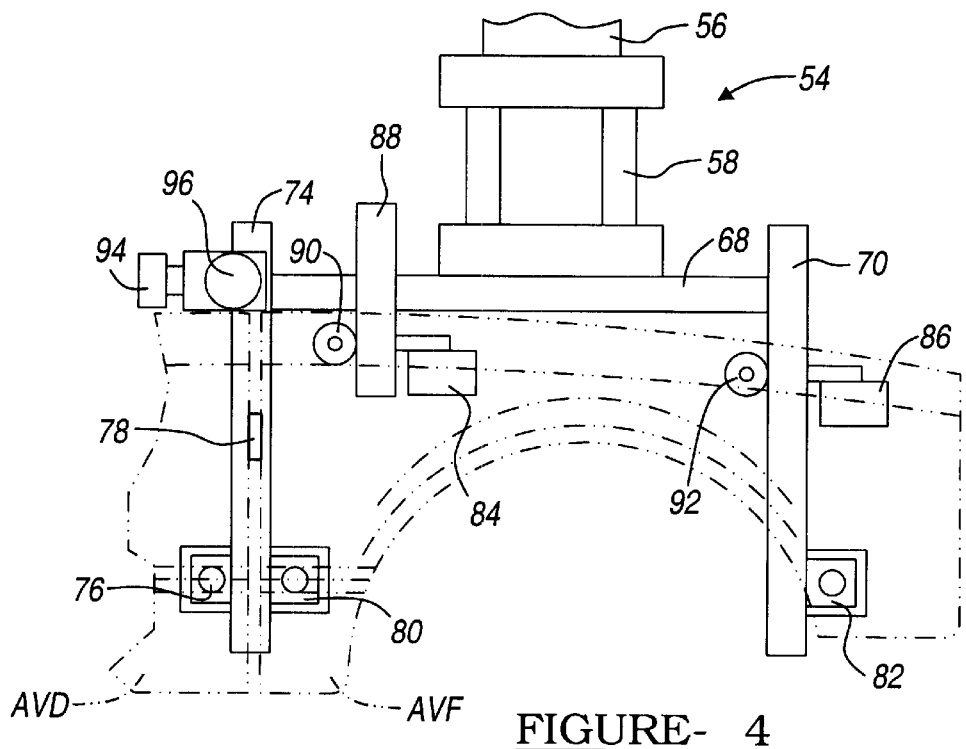
FIG. 4 is an elevated side view of a portion of the automobile body component supporting and aligning system of FIG. 3 as positioned against a vehicle body component.

FIG. 4 illustrates a side view of the system of the present invention in association with automobile components. More particularly, the side arms 74 and 70 of the assembly system 50 are positioned adjacent an automotive vehicle door AVD and an automotive vehicle fender AVF. According to this scenario, the door AVD has been aligned with the vehicle frame (not shown) and has been fixed thereto. In this situation the fixed door acts as the principal locating point, or PLP for the fender AVF. A first suction cup assembly 76 is fitted to the lower portion of the side arm 74 and is adapted to fix the arm 74 in position with respect to the vehicle door AVD. The math-cut boot of the assembly 76 rests snugly against the outer skin of the door AVD and thus positions the boot of the assembly 76 vertically with respect to the door by mating with the contour of the door AVD. To position the assembly 76 vertically with respect to the door AVD, a spacing wedge 78 is fitted to the vehicle-facing side of the arm 74. The spacing wedge 78 is interchangeable and wedges having different widths may be employed depending on the desired width of the gap between components. Relying upon the vertical and horizontal positioning produced by the combination of the assembly 76 and the wedge 78, the vehicle fender AVF which is secured to the arms 74 and 70 by a second suction cup assembly 80 and a third suction cup assembly 82 respectively may be properly aligned against the vehicle frame for correct assembly. This arrangement provides for consistently accurate fits of a component being aligned with respect to the fixed component.

To further assure the proper fit of the fender AVF against the arms 70 and 74 a pair of positioning blocks 84 and 86 are provided. The block 84 is adjustably fixed to a cantilevered block arm 88 by a driver 90 which moves the block 84 along the Z-axis with respect to the figure. The block 84 includes a face side which is contoured to snugly mate with the outer surface of the component being held which, in this case, is the fender AVF.

The block 86 is adjustably fixed to the arm 70 by a driver 92 which also moves the block 86 along the Z-axis with respect to the figure. Like the block 84, the block 86 includes a face side which is contoured to snugly mate with the outer surface of the vehicle fender AVF.

Operation of the various drivers associated with the assemblies 76, 80, and 82 and the drivers 90 and 92 is controlled by one or more activators, such as the pair of palm buttons 94 and 96. As is known in the art, the palm buttons 94 and 96 require substantially simultaneous activation, and their spaced-apart configuration minimizes the risk of injury to the operator.

Figure 5:
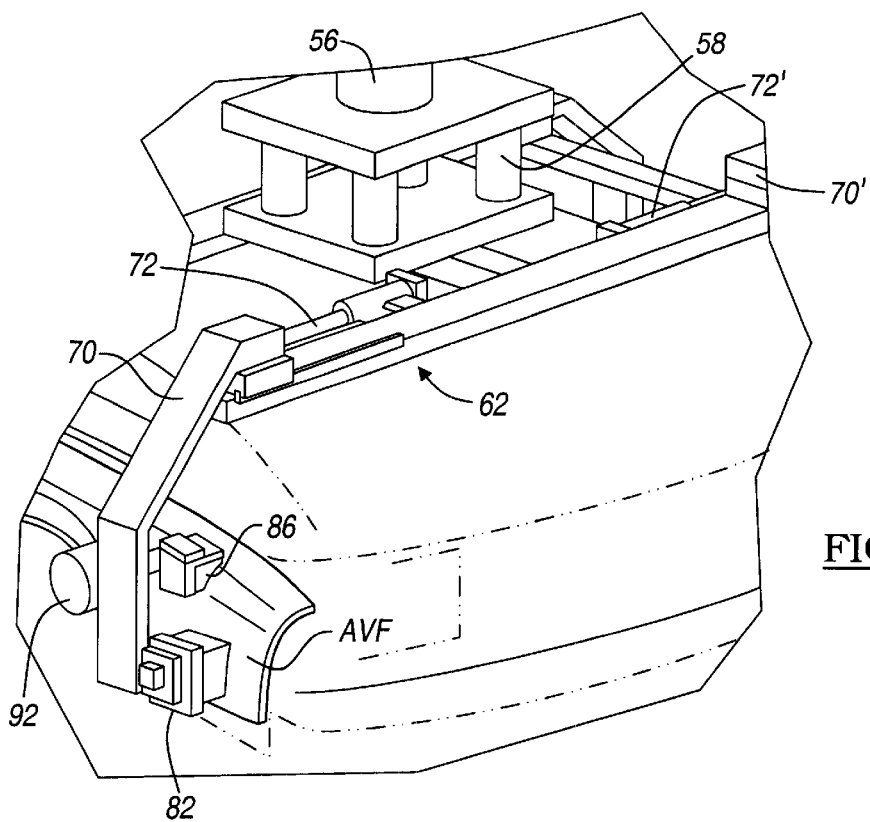
FIG. 5 is a peripheral corner view of a vehicle component being supported by members of the system shown in FIG. 3.

FIG. 5 illustrates an alternate view of a portion of the assembly system 50 relative to the automotive vehicle fender AVF. This view illustrates more clearly the contoured face of the block 86 and its mating and supporting relationship to the fender AVF. As illustrated, the block 86 is contoured according to the adjacent surface configuration of the fender AVF. Also illustrated is the position of the contoured face of the boot of the suction cup assembly 82 and its position relative to the fender AVF.

Figure 6:
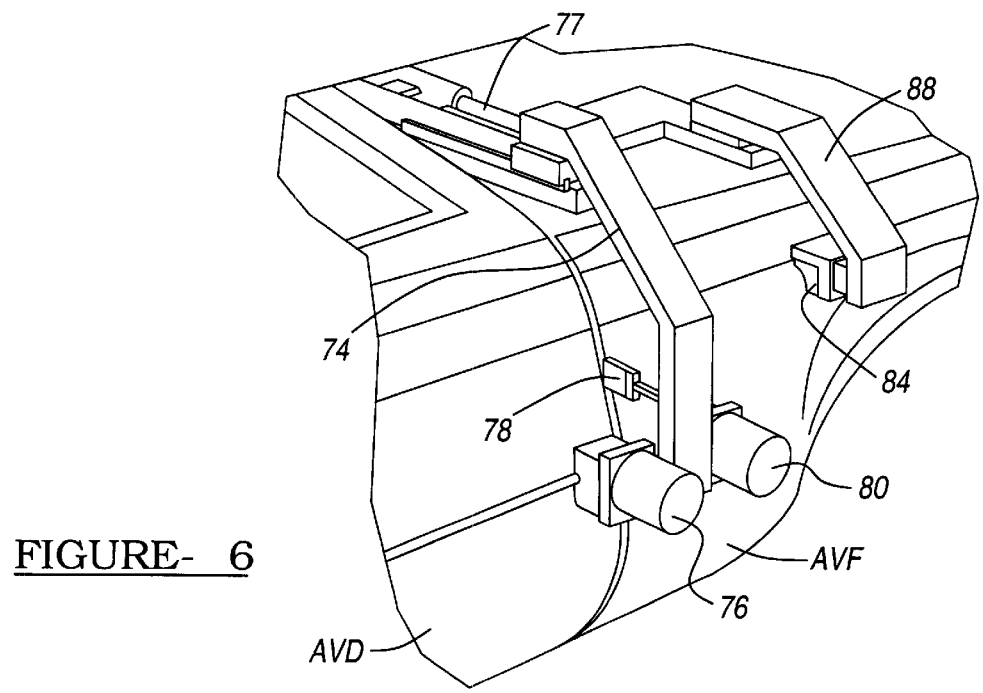
FIG. 6 is an alternate peripheral view of a vehicle component being aligned with another vehicle component as manipulated by members of the system shown in FIG. 3.

FIG. 6 illustrates still another alternate view of a portion of the assembly system 50 relative to the automobile vehicle fender AVF, but further including a portion of the automotive vehicle door AVD. The door AVD which, according to this illustration, has been aligned and mounted, acts as an alignment point against which the fender AVF is aligned and positioned. As with the illustration of FIG. 5, the view of FIG. 6 shows well the surface contours of block 84 and the boot of the assembly 76. This view also is useful in that it illustrates the relative position of the wedge 78.

It should be understood that the numbers and relative position of the aligning blocks 84 and 86 are only exemplary and are not intended as being limiting. Similarly, while a minimum number of suction cup assemblies is most likely the illustrated three when used to align and attach a body component of some size such as a fender (one cup attached to the fixed panel for relative alignment and attachment of the loose component and two cups being necessary for the relative positioning of the loose component), it is conceivable that more suction cup assemblies could be used. Similarly, for smaller loose components, only two assemblies might be used (one for the fixed component and one for the loose component).

In operation, the adjustable portion 58 is manipulated such that he supporting portion 60 and its associated frame 62 is lowered relative to the vehicle frame. Thereafter, the arm drivers 72 and 76 are activated such that the arms 70 and 74 respectively are moved to a position spaced apart from the vehicle frame. A vehicle component, such as a fender, is positioned adjacent the suction cup assemblies 80 and 82. The suction cups of the assemblies are activated so that they are advanced outwardly against the surface of the fender with sufficient force so that air is evacuated therefrom. The cups are thereafter drawn back in against the boots of the assemblies, and the fender is retained in position against the assemblies.

The arm drivers 72 and 76 then operate in the opposite direction so as to bring the arms 70 and 74 act to position the fender adjacent the vehicle frame. Attachment of the fender is thereafter made by known procedures (i.e., mechanical fastening or welding). Once attached to the frame, the drivers 72 and 76 act to again move the arms 70 and 74 away from the vehicle.

The fixed fender thus acts as a reference point against which all of the other components are positioned. Either the vehicle or the entire assembly system is moved to a second station where the next component, such as a door, is to be attached. The door is mated with the suction cup assemblies 80 and 82 in the same manner as described above with respect to the door. With the door so mated, the drivers 72 and 76 are operated so as to bring the door to its position adjacent the frame. However, with the fixed fender available to act as a reference point, the door is positioned close to the fixed fender separated only by the wedge 78. The suction cup assembly 76 is then activated such that it is mated with the fixed fender, thus bringing the arms 70 and 74 and the associated door into correct alignment. The door is then fixed to the frame in the known way. This procedure is repeated with the next adjacent component, whether it is a door (in the case of four door vehicles) or a fender.

By this operation, the system 50 not only provides effective side-to-side alignment of the components, but is effective in controlling depth alignment as well, whereby the arms 70 and 74 are acted upon to manipulate the panel inward or outward along the Z-axis as viewed in FIG. 4. This arrangement eliminates the need for drilling or pins as used today to align the component to the proper depth. The contoured face of the suction cup assembly's boot also assures that a proper alignment will be effected.

The system 50 and its associated drivers, suction cup assemblies, and blocks is selectively operated by air logic sequencing. According to this method of sequencing operations, a first puff of air is released by one or more air pilots (not shown) in response to a signal. The first puff of air sets off a first function. After completion of the first function, a second puff of air is released to set off a second function, and so forth until each of the desired functions of the sequences is completed. Alternatively, the system 50 may be selectively operated by a computer program. Furthermore, while the system 50 has been described in the alignment and attachment of fenders and doors, it may easily find application in the alignment and attachment of other components, such as trunk lids, roof components, and engine hoods. Even more broadly, the system 50 may find application in almost any assembly procedure where two or more components are being fitted to one another or to a substrate.

Although reference has been made in the description set forth above to certain components, the counterpart components indicated by primed numbers (such as the arms 70' and 74') operate in the same was as their non-primed counterparts.

Figure 7:
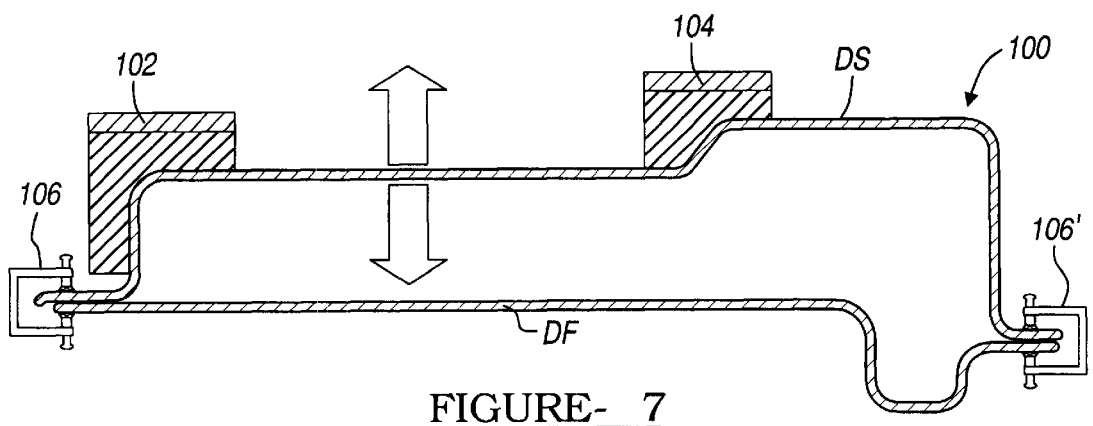
FIG. 7 is a sectional view of two portions of an assembly being fitted together.
Figure 8:
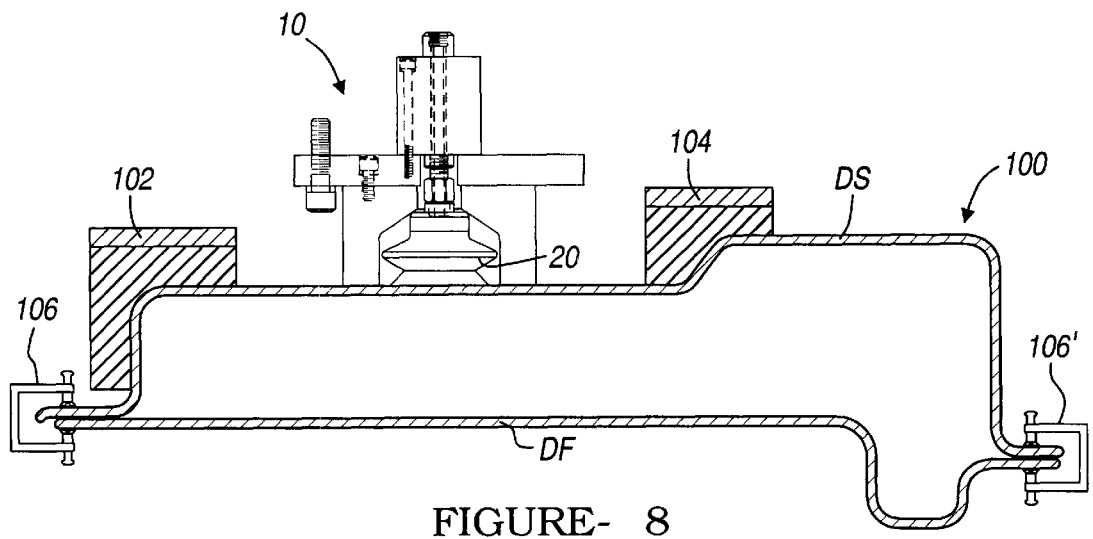
FIG. 8 is a view similar to that of FIG. 7, but showing another preferred application of the cup assembly of FIGS. 1 and 2 in operation as part of a system to assemble two components to form an assembly.

While FIGS. 3 through 6 have been directed to the use of a system according to the present invention in the assembly of vehicle components to a vehicle frame, the present invention may also find application in the assembly of two components, such as a door skin to a door frame. FIGS. 7 and 8 are directed to this application.

Referring to FIG. 7, a door assembly, illustrated generally as 100, is shown and includes an outer door skin DS and an inner door frame, indicated as DF. Traditionally the door skin DS has been composed of a relatively thin metal, while the door frame DF is composed of a heavier stock. During assembly, one or more blocks (such as the illustrated blocks 102 and 104) are used to generally support the door skin DF. The blocks 102 and 104 each include a contoured, door skin-contacting surface. With the door frame DF in position against the backside of the door skin DS, a pair of clamps, 106 and 106', are employed to hold the door skin DS to the door frame DF such that the fastener of the two (by mechanically fastening or by welding) can be accomplished.

The problem of this method as used today is that the outer door skin DS is generally substantially planar and is unsupported. There is a tendency, accordingly, for the metal to bow in an inward or outward direction as indicated by arrows in FIG. 7. Today holes are drilled and supporting pins are used to support the door skin during the assembly process. While being somewhat effective to overcome the bowing effect, the known method is time consuming and expensive.

The present system may be used to avoid the problems of known methods of attaching two components. Specifically, and with reference to FIG. 8, the suction cup assembly 10 of FIGS. 1 and 2 may be employed to support the door skin DS from the outside without the need for drilling or otherwise causing damage to the door skin. As described above with respect to the system 50 of FIGS. 3 through 6, the cup 20 of the suction cup assembly 10 is extended outward to contact the door skin DS and is further extended to evacuate the captured air, thus creating a component-holding vacuum. The cup 20 is then drawn back into the bore 16, and the outer surface of the door skin DS is brought into contact with the face 28 of the boot 24. The configuration of the door skin DS may then be maintained during the assembly process.

While FIGS. 7 and 8 are directed to the attachment of a door skin DS to a door frame DF, it is to be understood that the system of the present invention may readily be employed to attach other components together to form an assembly, such as a refrigerator door to a door frame.

Since from the foregoing embodiment the construction and advantages of the present holding apparatus may be readily understood, further explanation is believed to be unnecessary. However, since numerous modifications will readily occur to those skilled in the art after a consideration of the foregoing specification and accompanying drawings, it is not intended that the invention be limited to the embodiment disclosed herein, but all suitable modifications and equivalents may be resorted to which fall within the scope of the appended claims. Having described the invention,

What is claimed is:

1. A vehicle panel alignment system for coupling a vehicle component having an exterior surface defining a non-flat contour to a vehicle body comprising:

a suction cup assembly including a housing, said housing having a non-flat face matable with said non-flat contour of said exterior surface of said component and having a contour substantially the same as a portion of the non-flat contour prior to engagement with the component, a suction cup operably associated with said housing and being movable with respect thereto, and means for selectively moving said suction cup with respect to said housing, wherein said suction cup is operable to grasp the article and positions the article in nesting position with the contoured surface of said housing;

an arm having a pneumatic drive mechanism capable of moving said suction cup to a non-flat surface engaging position; and a frame surrounding the vehicle body to which said suction cup assembly and said arm are operably attached, said suction cup assembly and said arm being fixed in spaced apart relation on said frame.

2. The system according to claim 1, wherein said drive mechanism is positioned between said arm and said frame for selectively positioning said arm with respect to said component.

3. The system according to claim 1 wherein said housing is annularly disposed about said suction cup.

4. The system according to claim 1 wherein said arm is capable of moving the suction cup to a non-flat surface retrieved position wherein said contoured surface engages the portion of the non-flat surface.

* * * * *